US009581758B2

(12) United States Patent
Chen et al.

(10) Patent No.: US 9,581,758 B2
(45) Date of Patent: *Feb. 28, 2017

(54) BACKLIGHT MODULE AND DISPLAY DEVICE HAVING THE SAME

(71) Applicant: RADIANT OPTO-ELECTRONICS CORPORATION, Kaohsiung (TW)

(72) Inventors: Chien-Hung Chen, Kaohsiung (TW); Teng-Yi Huang, Kaohsiung (TW); Yung-Chieh Chao, Kaohsiung (TW); Sung-Fu Wu, Kaohsiung (TW)

(73) Assignee: RADIANT OPTO-ELECTRONICS CORPORATION, Kaohsiung (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/919,839

(22) Filed: Oct. 22, 2015

(65) Prior Publication Data

US 2016/0041330 A1    Feb. 11, 2016

Related U.S. Application Data

(63) Continuation-in-part of application No. 14/161,897, filed on Jan. 23, 2014, now Pat. No. 9,194,998.

(30) Foreign Application Priority Data

Aug. 2, 2013  (TW) .............................. 102127822 A

(51) Int. Cl.
F21V 8/00      (2006.01)

(52) U.S. Cl.
CPC ........... *G02B 6/0085* (2013.01); *G02B 6/009* (2013.01); *G02B 6/0068* (2013.01); *G02B 6/0073* (2013.01)

(58) Field of Classification Search
CPC ............................ G02B 6/0085; G02B 6/0073
USPC .................................................. 362/630–634
See application file for complete search history.

(56) References Cited

U.S. PATENT DOCUMENTS

| 8,382,361 B2 | 2/2013 | Park |
| 8,459,857 B2 | 6/2013 | Shibata et al. |
| 8,616,737 B2 | 12/2013 | Lim et al. |
| 8,911,124 B2 | 12/2014 | Lim et al. |
| 9,194,998 B2 * | 11/2015 | Wu .................. G02B 6/0085 |
| 2012/0320629 A1 | 12/2012 | Lim et al. |
| 2013/0194825 A1 | 8/2013 | Nam et al. |

FOREIGN PATENT DOCUMENTS

| CN | 103162271 | 6/2013 |
| TW | I349141 | 9/2011 |

OTHER PUBLICATIONS

Chinese Search Report issued in Application No. 2013103348553 dated Feb. 28, 2015 (w/ partial translation).
Taiwanese Search Report issued in Application No. 102127822 dated May 28, 2015 (w/ trans.).

* cited by examiner

*Primary Examiner* — Anabel Ton
(74) *Attorney, Agent, or Firm* — Nixon & Vanderhye P.C.

(57) ABSTRACT

A backlight module includes a frame structure, a heat sink, a light source and a light guiding plate. The frame structure includes a cover unit that defines an airgap therein. The heat sink is located below the airgap of the cover unit. The light source directly contacts the heat sink. The light guiding plate is disposed to correspond in position to the light source for receiving light emitted from the light source. The heat sink is located between the light guiding plate and the cover unit.

23 Claims, 7 Drawing Sheets

BACKLIGHT MODULE AND DISPLAY DEVICE HAVING THE SAME

CROSS-REFERENCE TO RELATED APPLICATION

This application is a continuation-in-part (CIP) of co-pending U.S. patent application Ser. No. 14/161,897, filed on Jan. 23, 2014, which claims priority of Taiwanese Application No. 102127822, filed on Aug. 2, 2013.

FIELD

The disclosure relates to a lighting module, particularly so a backlight module.

BACKGROUND

Backlight modules are commonly utilized in various flat screen displays. A backlight module usually includes a light source, a back plate and a light guiding plate. As the structure of the display becomes ever thinner, the light source generates heat that tends to cause bending of the back plate.

The most common solution presently is adding a heat sink to help conduct and dissipate the heat. However, such design does not dissipate heat efficiently enough to prevent the back plate from bending cause by the heat.

SUMMARY

Therefore, an object of the disclosure is to provide a backlight module that can eliminate the aforesaid drawback of the prior art.

According to the disclosure, the backlight module includes a frame structure, a heat sink, a light source and a light guiding plate. The frame structure includes a cover unit that defines an airgap therein. The heat sink is located below the airgap of the cover unit. The light source directly contacts the heat sink. The light guiding plate is disposed to correspond in position to the light source for receiving light emitted from the light source. The heat sink is located between the light guiding plate and the cover unit.

Another object of the disclosure is to provide a backlight module that can eliminate the aforesaid drawback of the prior art.

According to the disclosure, the backlight module includes a frame structure, a heat sink, a light source and a light guiding plate. The frame structure includes a cover unit that defines an airgap therein. The heat sink is located below the airgap of the cover unit. The light source is disposed in the frame structure. The light guiding plate is disposed to correspond in position to the light source for receiving light emitted from the light source, and has a top end not higher than that of the cover unit.

Still another object of the disclosure is to provide a backlight module that can eliminate the aforesaid drawback of the prior art.

According to the disclosure, the backlight module includes a frame structure, a heat sink, a light source and a light guiding plate. The frame structure includes a cover unit that defines an airgap therein. The heat sink is located below the airgap of the cover unit, and has a main body and a protrusion that protrudes from a side surface of the main body distal from the cover unit. The light source is disposed in the frame structure. The light guiding plate is disposed to correspond in position to the light source for receiving light emitted from the light source, and is supported by the protrusion of the heat sink to be spaced apart from the main body of the heat sink.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
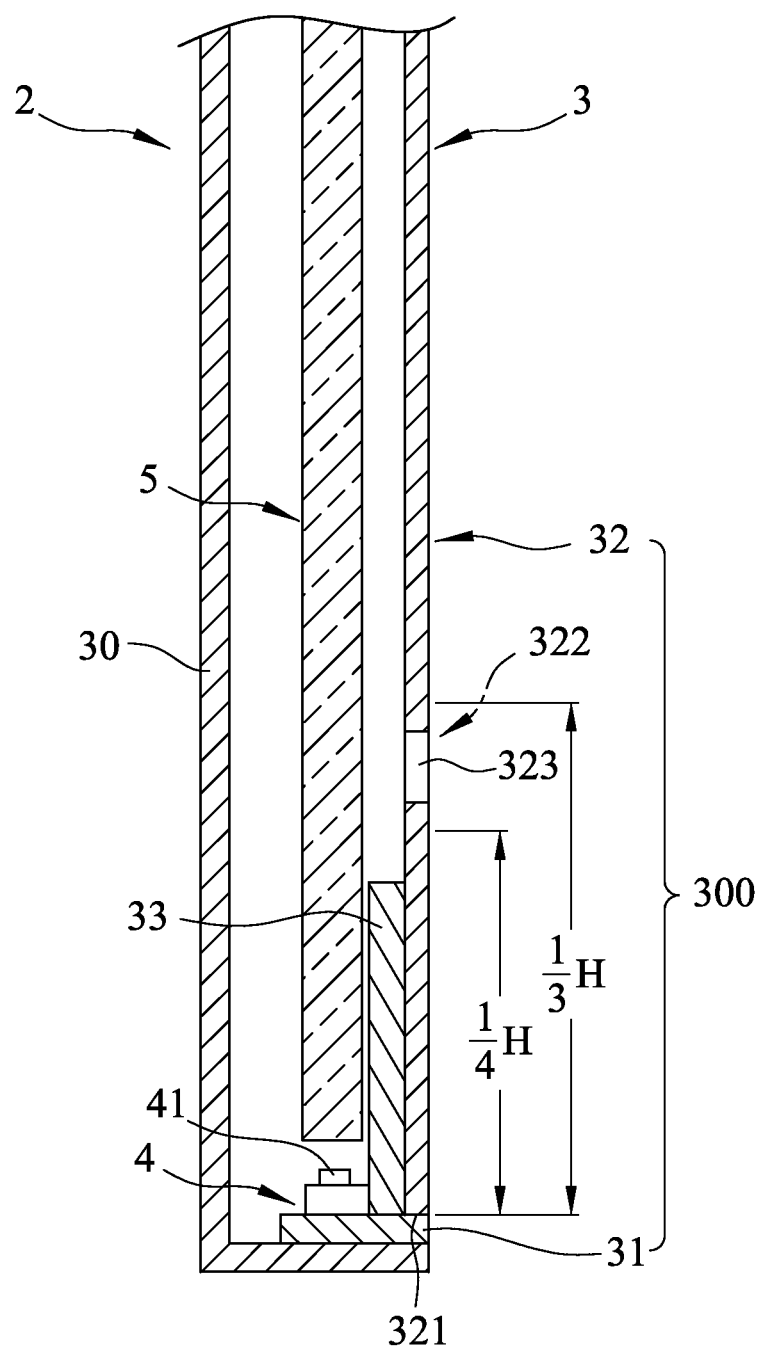
FIG. 1 is a fragmentary schematic sectional view of a first embodiment of a backlight module according to the disclosure.

Before the disclosure is described in greater detail, it should be noted that like elements are denoted by the same reference numerals throughout the disclosure.

Figure 2:
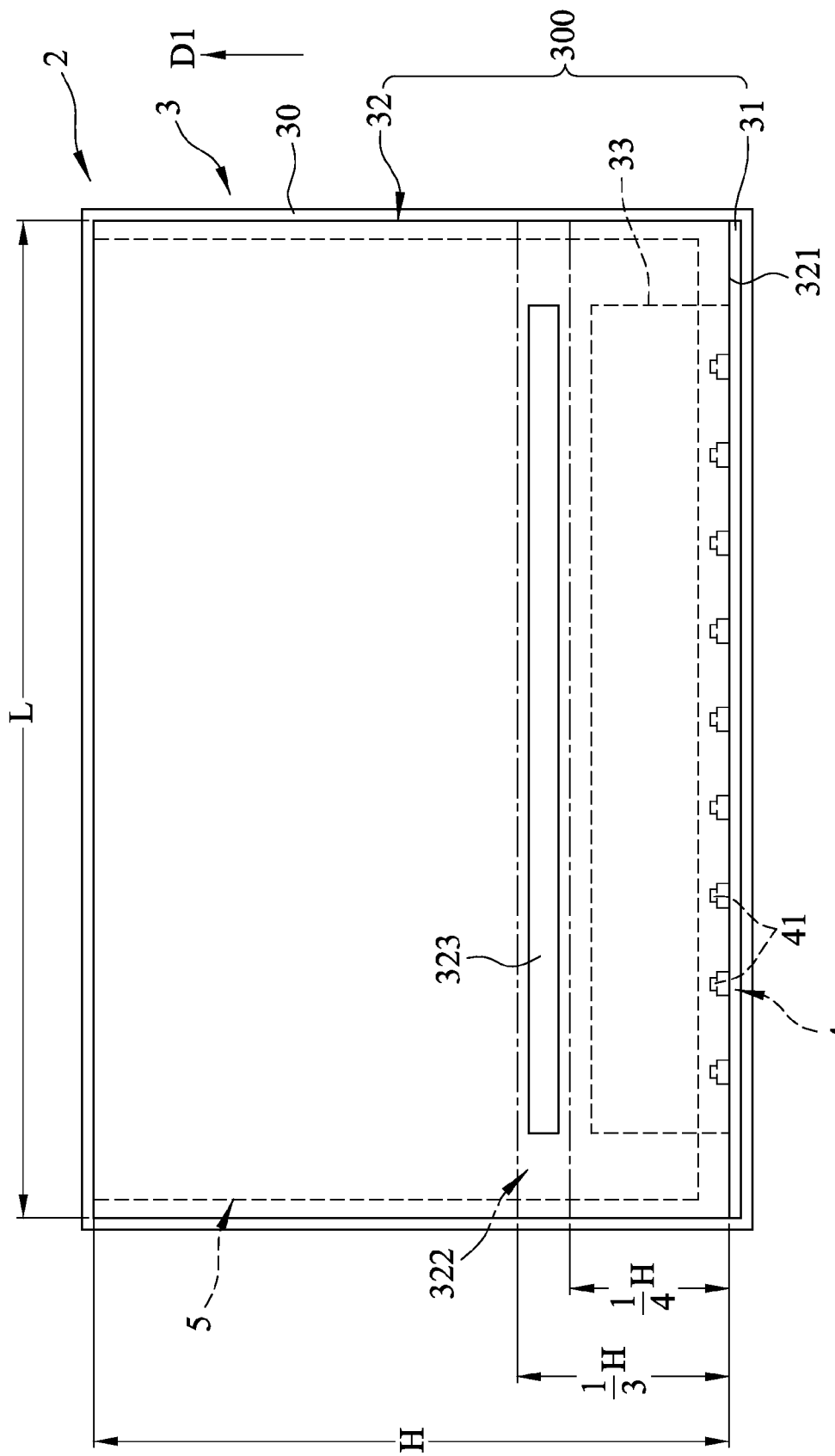
FIG. 2 is a front schematic view of the first embodiment.

With reference to FIGS. 1 and 2, a first embodiment of a backlight module 2 according to the present disclosure includes a frame structure 3, a light source 4 disposed on the frame structure 3, and a light guiding plate 5 disposed to correspond in position to the light source 4 for receiving light emitted from the light source 4.

The frame structure 3 includes an outer frame 30, a cover unit 300 and a heat sink 33. The cover unit 300 includes a horizontal base plate 31 chat is horizontally disposed on the outer frame 30, and a vertical back plate 32 that is vertically disposed on an upper side of the base plate 31. The heat sink 33 is disposed on and directly contacts the back plate 32, and extends from the upper side of the base plate 31.

The light source 4 is disposed on the upper side of the horizontal base plate 31, directly contacts the heat sink 33, and includes a plurality of spaced-apart light emitting diodes (LEDs) 41. The light guiding plate 5 is disposed on the outer frame 30 to correspond in position to the light source 4 for receiving light emitted by the light source 4, has a top end not higher than that of the back plate 32, and is entirely covered by the cover unit 300. It should be noted that the structure of the outer frame 30, and the relationship between the outer frame 30 and the light guiding plate 5 are not the focus of the present disclosure and will not be illustrated and discussed further in detail.

The back plate 32 has a bottom end 321 that is connected to the upper side of the back plate 32, a predetermined on 322 between ⅓ and ¼ of a vertical height (H) of the back plate 32 from the bottom end 321, and an elongated horizontal through hole 323 formed within the predetermined zone 322. A horizontal length of the horizontal through hole 323 is not less than 80% of a horizontal length (L) of the back plate 32. The heat sink 33 has a top end that is disposed below a bottom end of the through hole 323 for dissipating heat generated by the LEDs 41. In this embodiment, the horizontal through hole 323 is substantially disposed at the center of the predetermined zone 322.

It is noted that, in this embodiment, the light guiding plate 5 is aligned with the light source 4 in a first direction (D1) (i.e., an up-down direction of the backlight module 2, see FIG. 2). The back plate 32 has a first segment located above the horizontal through hole 323, and a second segment located below the horizontal through hole 323. The first and second segments of the back plate 32 are formed as one piece, surround the horizontal through hole 323, and are aligned with each other in the first direction (D1).

The heat generated by the LEDs 41 is conducted to the back plate 32 via the base plate 31 and the heat sink 33. The heat is limited below the horizontal through hole 323 because the heat sink 33 is disposed below the horizontal through hole 323 and because the horizontal length of the horizontal through hole 323 is at least 80% of the horizontal length (L) of the back plate 32. In effect, the horizontal through hole 323 serves as an airgap to segregate the heat, to substantially reduce the amount of heat passing to the upper side of the back plate 32, and to effectively prevent bending of the back plate 32 caused by the heat.

Figure 3:
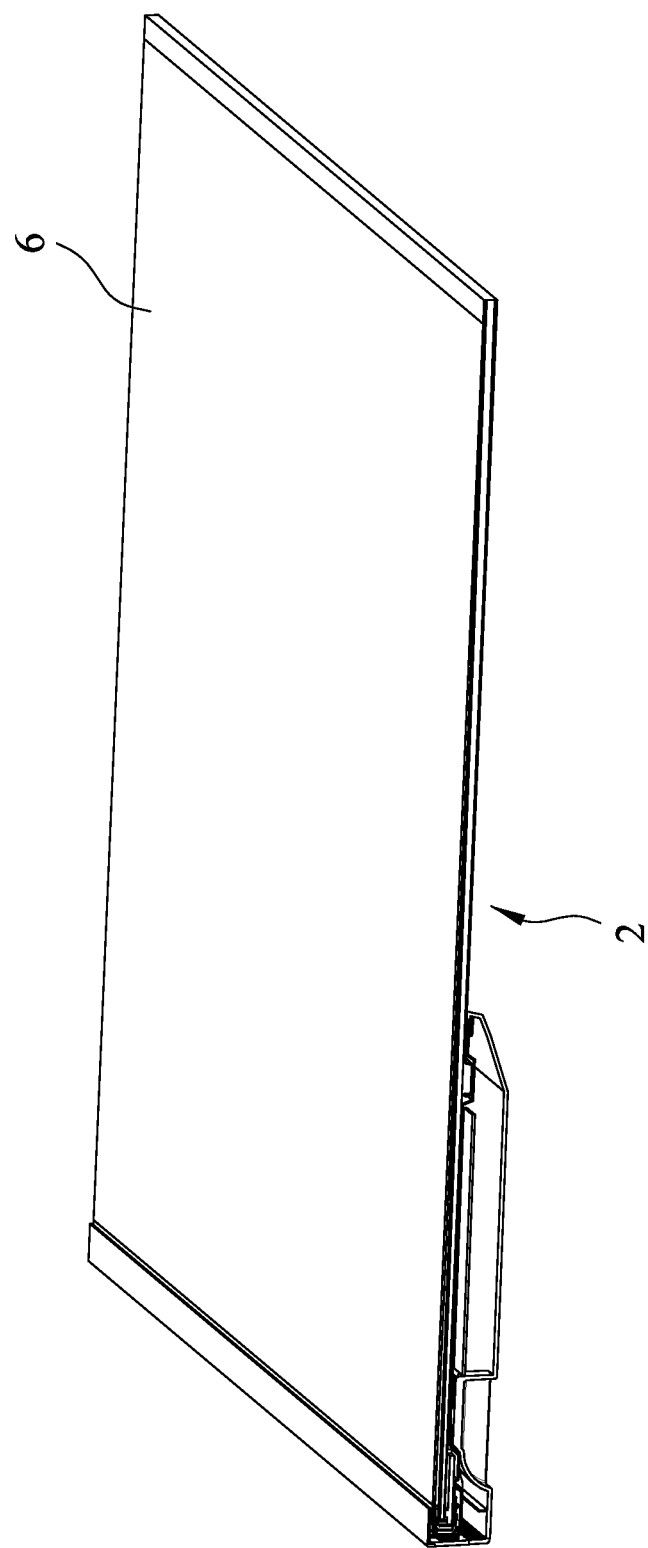
FIG. 3 is a schematic perspective cutaway view of a second embodiment of the backlight module according to the disclosure mounted with a display panel.
Figure 4:
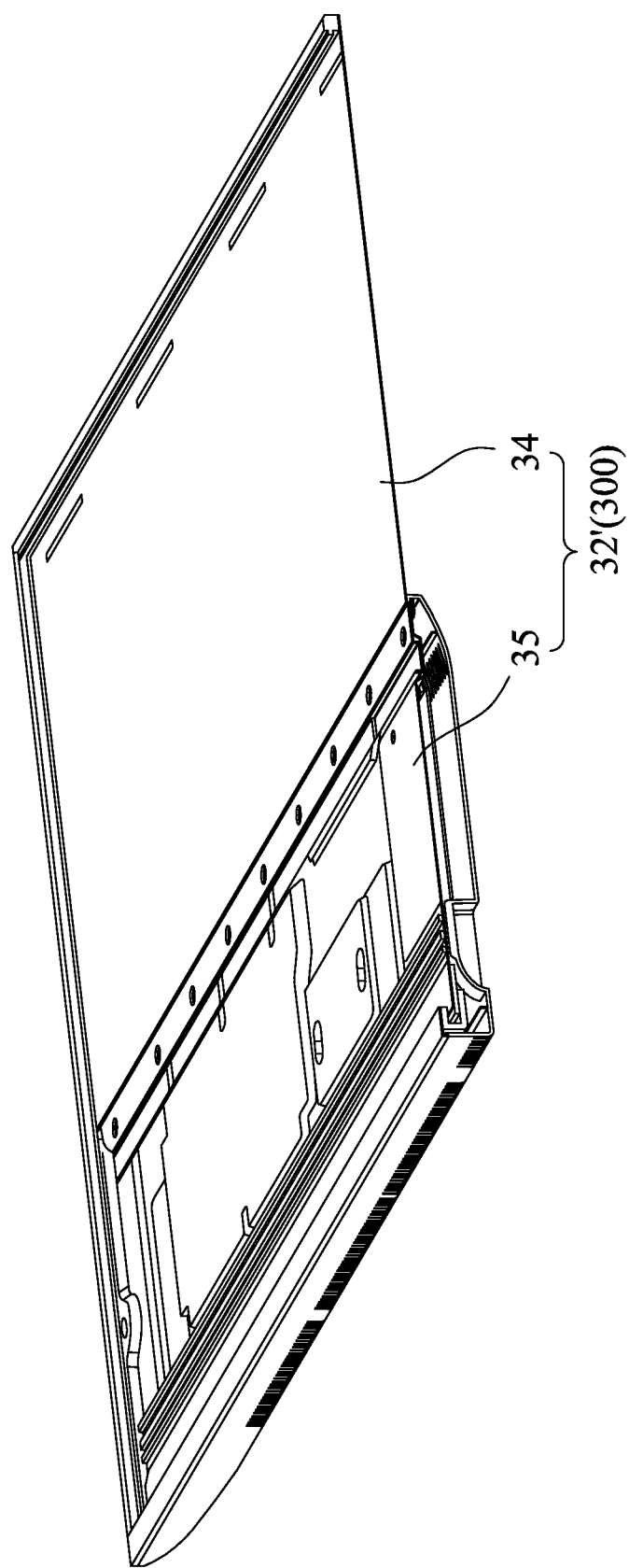
FIG. 4 is a fragmentary perspective cutaway view of the second embodiment with a light guiding plate being omitted.
Figure 5:
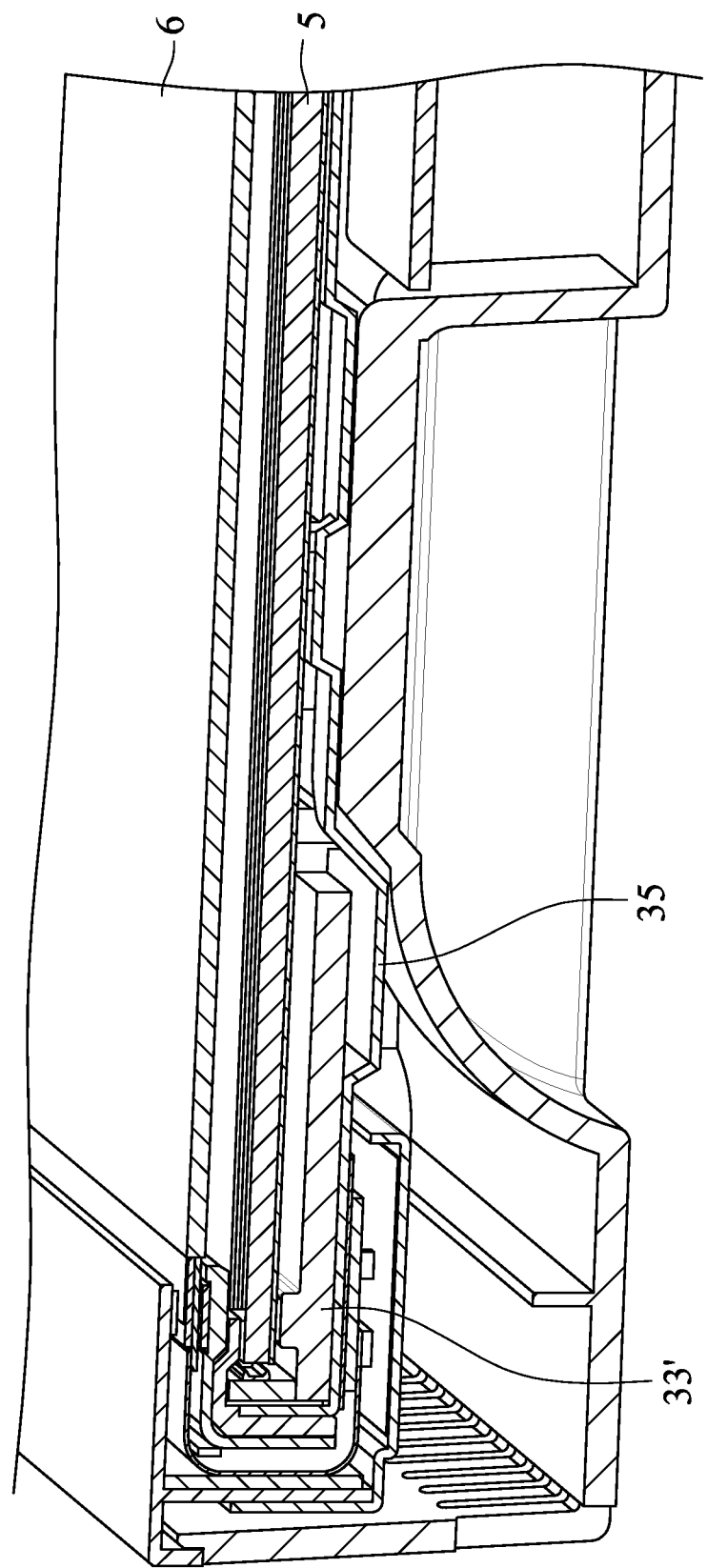
FIG. 5 is another fragmentary perspective cutaway view of the second embodiment.
Figure 6:
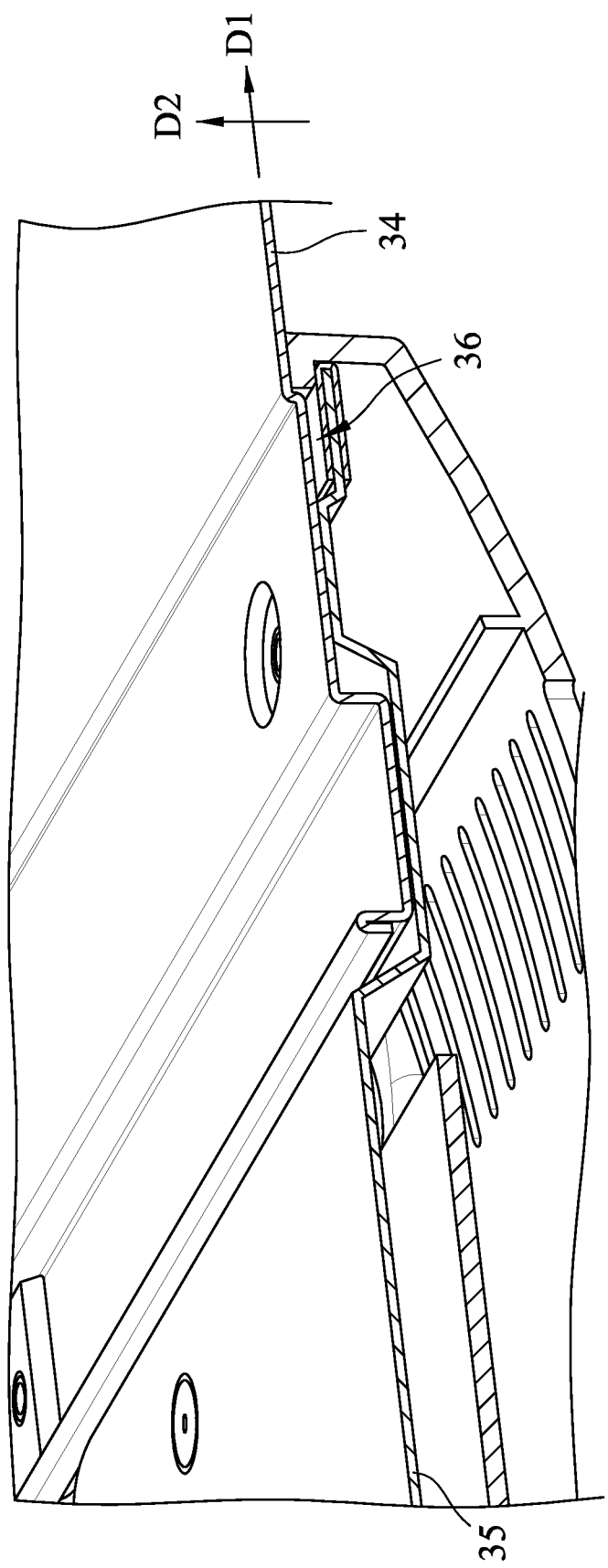
FIG. 6 is still another fragmentary perspective cutaway view of the second embodiment with the light guiding plate being omitted.
Figure 7:
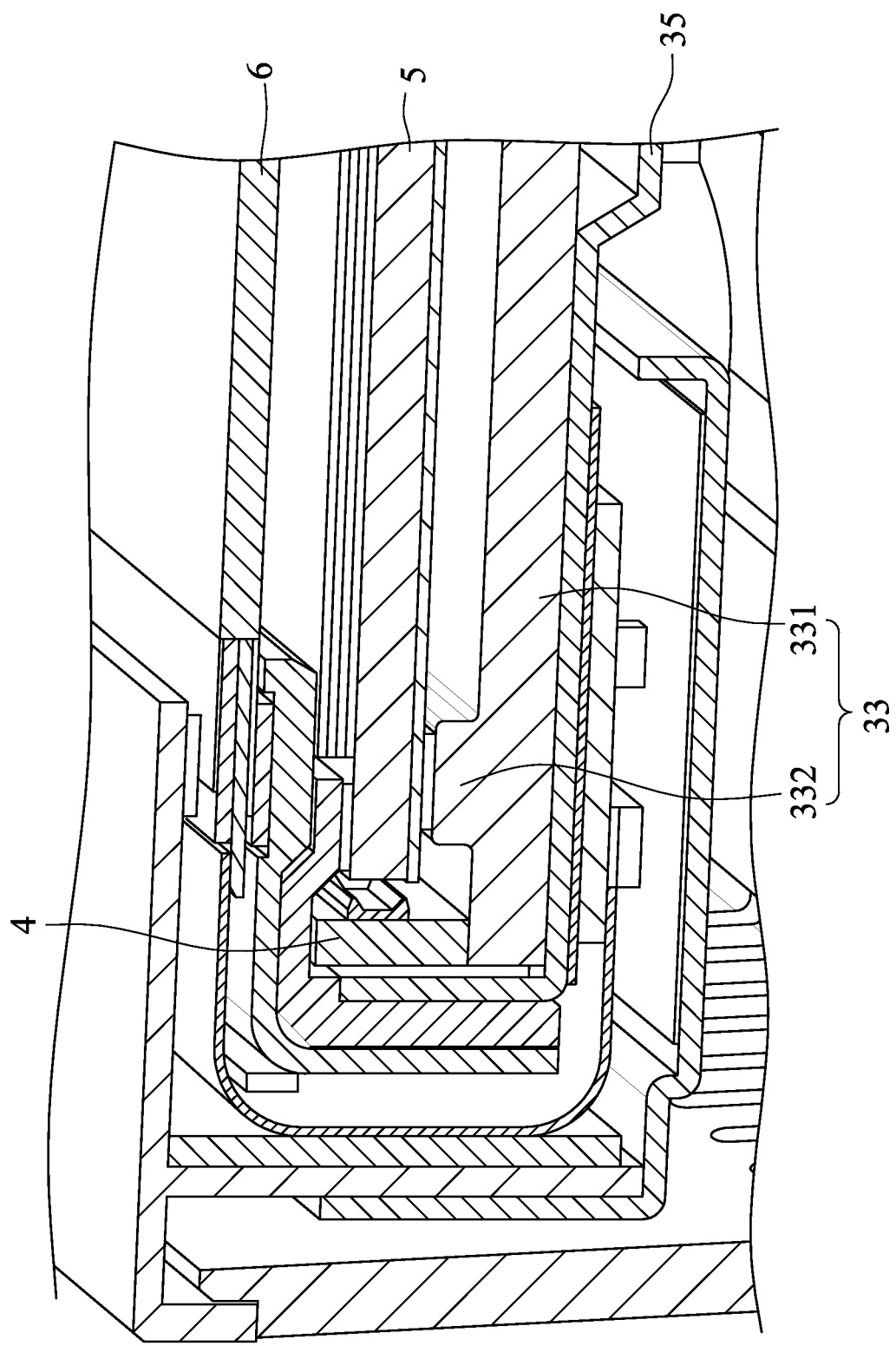
FIG. 7 is an enlarged fragmentary perspective cutaway view of the second embodiment.

Referring to FIG. 3, a second embodiment of the backlight module 2 according to the present disclosure is similar to the first embodiment, and is mounted with a display panel 6 to form a display device.

Referring further to FIGS. 4 to 7, in the second embodiment, the base plate 31 (see FIG. 1) of the cover unit 300 is omitted, and the back plate 32' of the cover unit 300 includes a first body 34 and a second body 35. The first body 34 has a space-defining-portion that cooperates with a space-defining-portion of the second body 35 to define a space 36 (see FIG. 6) therebetween that serves as an airgap for heat insulation. It is noted that, in this embodiment, the space-defining-portion of the first body 34 and the space-defining-portion of the second body 35 are aligned in a second direction (D2) (i.e. a front-rear direction of the backlight module 2, see FIG. 6) perpendicular to the first direction (D1) (i.e. an up-down direction of the backlight module 2, see FIG. 6) in which the light guiding plate 5 and the light source 4 (see FIG. 7) are aligned. Moreover, the heat sink 33' is disposed between the light guiding plate 5 and the second body 35 of the cover unit 300, and has a main body 331 and a protrusion 332 that protrudes from a side surface of the main body 331 distal from the second body 35. The light guiding plate 5 is supported by the protrusion 332 of the heat sink 33' to be spaced apart from the main body 331 of the heat sink 33'. The display panel 6 is disposed at one side of the light guiding plate 5 opposite to the cover unit 300.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A backlight module comprising:
   a frame structure including a cover unit that defines an airgap therein;
   a heat sink located below said airgap of said cover unit;
   light source directly contacting said heat sink; and
   a light guiding plate disposed to correspond in position to said light source for receiving light emitted from said light source, said heat sink being located between said light guiding plate and said cover unit.

2. The backlight module of claim 1, wherein said cover unit includes a first body and a second body, said airgap being defined between said first and second bodies.

3. The backlight module of claim 2, wherein said light guiding plate is aligned with said light source in a first direction, said first body having a portion that cooperates with a portion of said second body to define said airgap therebetween, and that is aligned with said portion of said second body in a second direction different from the first direction.

4. The backlight module of claim 2, wherein said light guiding plate is aligned with said light source in a first direction, said first body having a portion that cooperates with a portion of said second body to define said airgap therebetween, and that is aligned with said portion of said second body in the first direction.

5. The backlight module of claim 4, wherein said first and second bodies are formed as one piece, said airgap being surrounded by said first and second bodies.

6. The backlight module of claim 1, wherein said heat sink directly contacts said cover unit.

7. A display device comprising:
   a backlight module of claim 1; and
   a display panel disposed at one side of said light guiding plate opposite to said cover unit.

8. A backlight module comprising:
   a frame structure including a cover unit that defines an airgap therein;
   a heat sink located below said airgap of said cover unit;
   a light source located at said cover unit of said frame structure; and
   a light guiding plate disposed to correspond in position to said light source for receiving light emitted from said light source, and having a top end not higher than that of said cover unit.

9. The backlight module of claim 8, wherein said light source directly contacts said cover unit and said heat sink, said heat sink being located between said light guiding plate and said cover unit.

10. The backlight module of claim 8, wherein said light guiding plate is entirely covered by said cover unit.

11. The backlight module of claim 8, wherein said cover unit includes a first body and a second body, said airgap being defined between said first and second body.

12. The backlight module of claim 11, wherein said light guiding plate is aligned with said light source in a first direction, said first body having a portion that cooperates with a portion of said second body to define said airgap therebetween, and that is aligned with said portion of said second body in a second direction different from the first direction.

13. The backlight module of claim 11, wherein said light guiding plate is aligned with said light source in a first direction, said first body having a portion that cooperates with a portion of said second body to define said airgap therebetween, and that is aligned with said portion of said second body in the first direction.

14. The backlight module of claim 13, wherein said first and second bodies are formed as one piece, said airgap being surrounded by said first and second bodies.

15. A display device comprising:
    a backlight module of claim 8; and
    a display panel disposed at one side of said light guiding plate opposite to said cover unit.

16. A backlight module comprising:
    a frame structure including a cover unit that defines an airgap therein;

a heat sink located below said airgap of said cover unit, and having a main body and a protrusion that protrudes from a side surface of said main body;

a light source located at said cover unit of said frame structure; and a light guiding plate disposed to correspond in position to said light source for receiving light emitted from said light source, and supported by said protrusion of said heat sink to be spaced apart from said main body of said heat sink.

17. The backlight module of claim 16, wherein said light source directly contacts said heat sink.

18. The backlight module of claim 17, wherein said heat sink directly contacts said cover unit.

19. The backlight module of claim 16, wherein said cover unit includes a first body and a second body, said airgap being defined between said first and second bodies.

20. The backlight module of claim 19, wherein said light guiding plate is aligned with said light source in a first direction, said first body having a portion that cooperates with a portion of said second body to define said airgap therebetween, and that is aligned with said portion of said second body in a second direction different from the first direction.

21. The backlight module of claim 19, wherein said light guiding plate is aligned with said light source in a first direction, said first body having a portion that cooperates with a portion of said second body to define said airgap therebetween, and that is aligned with said portion of said second body in the first direction.

22. The backlight module of claim 21, wherein said first and second bodies are formed as one piece, said airgap being surrounded by said first and second bodies.

23. A display device comprising:

a backlight module of claim 16; and a display panel disposed at one side of said light guiding plate opposite to said cover unit.

* * * * *